United States Patent
Huang et al.

(10) Patent No.: US 8,896,769 B2
(45) Date of Patent: Nov. 25, 2014

(54) PROJECTION SYSTEM

(71) Applicant: Min Aik Technology Co., Ltd., Taoyuan County (TW)

(72) Inventors: Shi-Hwa Huang, New Taipei (TW); Mao-Sheng Hsu, Tao Tuan (TW); Ming-Hsien Tsai, Tao Tuan (TW); Chi-Wei Chen, Tao Tuan (TW)

(73) Assignee: Min Aik Technology Co., Ltd., Taoyuan County (TW)

( * ) Notice: Subject to any disclaimer, the term of this patent is extended or adjusted under 35 U.S.C. 154(b) by 120 days.

(21) Appl. No.: 13/682,880

(22) Filed: Nov. 21, 2012

(65) Prior Publication Data

US 2013/0148040 A1    Jun. 13, 2013

(30) Foreign Application Priority Data

Dec. 9, 2011 (TW) .............. 100145603 A

(51) Int. Cl.
| | | |
|---|---|---|
| G02F 1/1335 | (2006.01) | |
| G03B 21/00 | (2006.01) | |
| G03B 21/20 | (2006.01) | |
| H04N 9/31 | (2006.01) | |

(52) U.S. Cl.
CPC .......... G02F 1/13362 (2013.01); G03B 21/006 (2013.01); G03B 21/2073 (2013.01); H04N 9/3111 (2013.01); H04N 9/3167 (2013.01); H04N 9/3173 (2013.01)
USPC ................................................ 349/5; 349/9

(58) Field of Classification Search
CPC .. G02B 27/283; G02B 27/286; G02B 27/149; G02B 27/26; G02B 27/30; G02B 27/126; G02B 27/28; G02B 27/285; G02B 5/045; G02B 5/04; G02B 6/0053; G02B 6/0031; H04N 9/3167; H04N 9/315; H04N 9/3152; H04N 9/3147; H04N 9/3155; H01L 33/58; H01L 33/60; G03B 21/28; G03B 21/00; G03B 21/005; G03B 21/142; B29D 11/0073; G02F 1/1313; G02F 1/133605; G02F 1/0136; G02F 1/13362; G02F 1/136277; G02F 1/1335; G02F 1/133526; G02F 1/133528; G02F 1/133536; G02F 1/133555; G02F 1/1336; G02F 2203/12
USPC .............. 352/20, 8, 33, 101, 81; 362/19, 297; 359/485.01, 485.06, 489.08, 487.04, 359/629, 641, 465, 485.03, 489.09, 726, 359/237, 352, 485.02, 489.14, 489.18, 359/492.01; 257/E33.068, 98; 349/8, 9, 5, 349/57, 158; 348/E9.027, E5.137, 58, 756
See application file for complete search history.

(56) References Cited

U.S. PATENT DOCUMENTS

2006/0221447 A1 * 10/2006 DiZio et al. ................... 359/491
2012/0140184 A1 * 6/2012 Bruzzone ........................ 353/20

* cited by examiner

Primary Examiner — Thoi Duong
(74) Attorney, Agent, or Firm — WPAT, PC; Justin King

(57) ABSTRACT

A projection system includes an illumination device, a LCOS microdisplay element, an optical projection lens, a total internal reflection prism, and a polarizer. The polarizer is a reflective polarizer or an absorptive polarizer. The total internal reflection prism is arranged between the illumination device, the LCOS microdisplay element and the optical projection lens. A plurality of lighting paths are created between the illumination device and the LCOS microdisplay element. A plurality of imaging paths are created between the LCOS microdisplay element and the optical projection lens. The polarizer is only located in the lighting paths.

15 Claims, 9 Drawing Sheets

PROJECTION SYSTEM

FIELD OF THE INVENTION

The present invention relates to a projection system, and more particularly to a LCOS (liquid crystal on silicon) projection system.

BACKGROUND OF THE INVENTION

A projection system is widely used in our daily lives to project texts/pictures or image data onto a screen in order to facilitate many people to view the enlarged texts/pictures or image data in a visually comfortable manner. Recently, the general trends in designing electronic devices are toward small size, light weightiness and easy portability to meet the requirements of humanization. Similarly, the projection system is developed toward miniaturization. As a consequence, the projection system can be applied to electronic devices such as 3G mobile phones or personal digital assistants (PDAs). In addition, a small-sized projection system becomes a portable electronic device. On account of its portability, the user may use a small-sized projection system to watch movies everywhere they are, and thus the amusement purpose can be achieved without difficulty.

FIG. 1 is a schematic view illustrating the structure and the optical paths of a conventional LCOS projection system. As shown in FIG. 1, the LCOS projection system 1 comprises an illumination device 11, a collimating lens assembly 12, a front-end polarizer 17, a polarization beam splitter (PBS) 13, a field lens 14, a LCOS microdisplay element 15, and an optical projection lens 16. The polarization beam splitter 13 comprises two prisms, wherein a reflective polarizing film 131 is formed on the interface between these two prisms. The polarization beam splitter 13 is arranged between the illumination device 11, the LCOS microdisplay element 15 and the optical projection lens 16. The collimating lens assembly 12 is arranged between the illumination device 11 and the front-end polarizer 17. The field lens 14 is arranged between the LCOS microdisplay element 15 and the polarization beam splitter 13.

The collimating lens assembly 12 and the field lens 14 are used for adjusting the incidence angles of the received light beams and outputting the adjusted light beams. The front-end polarizer 17 is used for blocking the P-polarized beams because the P-polarized beams are reflected or absorbed by the front-end polarizer 17. In addition, only the S-polarized beams are transmissible through the front-end polarizer 17. On the other hand, the reflective polarizing film 131 of the polarization beam splitter 13 is used for blocking the S-polarized beams because the S-polarized beams are reflected by the reflective polarizing film 131. In addition, only the P-polarized beams are transmissible through the reflective polarizing film 131 of the polarization beam splitter 13.

Moreover, the LCOS microdisplay element 15 is used for showing an electronic image. The illumination device 11 is used for providing a source ray to the LCOS microdisplay element 15. Consequently, a plurality of lighting paths are created between the illumination device 11 and the LCOS microdisplay element 15, and a plurality of imaging paths are created between the LCOS microdisplay element 15 and the optical projection lens 16. The electronic image is then projected onto a screen 9 through the optical projection lens 16.

Please refer to FIG. 1 again. The source ray provided by the illumination device 11 may be divided into two parts, i.e. P-polarized lighting beams $L_{1P}$ and S-polarized lighting beams $L_{1S}$. The P-polarized lighting beams $L_{1P}$ and the S-polarized lighting beams $L_{1S}$ are propagated along the corresponding lighting paths. The solid lines as shown in FIG. 1 denote some of the lighting paths, i.e. the transmission paths of the lighting beams ($L_{1P}+L_{1S}$).

After the source ray ($L_{1P}+L_{1S}$) provided by the illumination device 11 is transmitted through the collimating lens assembly 12 and directed to the front-end polarizer 17, the S-polarized lighting beams $L_{1S}$ are transmitted through the front-end polarizer 17 and directed to the polarization beam splitter 13. Whereas, the P-polarized lighting beams $L_{1P}$ are reflected to other places (not shown). Next, the S-polarized lighting beams $L_{1S}$ are reflected by the reflective polarizing film 131 of the polarization beam splitter 13, and directed to the LCOS microdisplay element 15 through the field lens 14. Next, the S-polarized lighting beams $L_{1S}$ are reflected by the LCOS microdisplay element 15. Correspondingly, the S-polarized lighting beams $L_{1S}$ are converted into a plurality of P-polarized imaging beams $I_{1P}$ in response to the electronic image. The P-polarized imaging beams $I_{1P}$ are propagated along the corresponding imaging paths. The dotted lines as shown in FIG. 1 denote some of the imaging paths, i.e. the transmission paths of the P-polarized imaging beams $I_{1P}$.

The P-polarized imaging beams $I_{1P}$ from the LCOS microdisplay element 15 are transmitted through the field lens 14, and directed to the polarization beam splitter 13. Next, the P-polarized imaging beams $I_{1P}$ are transmitted through the reflective polarizing film 131 of the polarization beam splitter 13, and directed to the optical projection lens 16. Consequently, the electronic image shown on the LCOS microdisplay element 15 is projected onto the screen 9 through the optical projection lens 16.

From the above discussions, the S-polarized lighting beams $L_{1S}$ are reflected by the reflective polarizing film 131 of the polarization beam splitter 13, and the P-polarized imaging beams $I_{1P}$ are transmissible through the reflective polarizing film 131 of the polarization beam splitter 13. However, the reflectivity and the transmissivity of the reflective polarizing film 131 are not ideally 100%. In other words, a portion of the S-polarized lighting beams $L_{1S}$ incident to the reflective polarizing film 131 are reflected by the reflective polarizing film 131 and directed to the LCOS microdisplay element 15. Whereas, the rest of the S-polarized lighting beams $L_{1S}$ are consumed or lost. In addition, a portion of the P-polarized imaging beams $I_{1P}$ incident to the reflective polarizing film 131 are transmitted through the reflective polarizing film 131 and directed to the optical projection lens 16. Whereas, the rest of the P-polarized imaging beams $I_{1P}$ are consumed or lost. That is, the light amount outputted from the optical projection lens 16 is much lower than the light amount outputted from the illumination device 11.

FIG. 2 is a schematic view illustrating the structure and the optical paths of another conventional LCOS projection system. As shown in FIG. 2, the LCOS projection system 2 comprises an illumination device 21, a collimating lens assembly 22, a reflective polarizer 23, a field lens 24, a LCOS microdisplay element 25, an analyzer 28, and an optical projection lens 26. The reflective polarizer 23 is arranged between the illumination device 21, the LCOS microdisplay element 25 and the optical projection lens 26. The collimating lens assembly 22 is arranged between the illumination device 21 and the reflective polarizer 23. The field lens 24 is arranged between the LCOS microdisplay element 25 and the reflective polarizer 23.

The collimating lens assembly 22 and the field lens 24 are used for adjusting the incidence angles of the received light beams and outputting the adjusted light beams. The reflective polarizer 23 is used for blocking the S-polarized beams because the S-polarized beams are reflected by the reflective polarizer 23. In addition, only the P-polarized beams are transmissible through the reflective polarizer 23.

Moreover, the LCOS microdisplay element 25 is used for showing an electronic image. The illumination device 21 is used for providing a source ray to the LCOS microdisplay element 25. Consequently, a plurality of lighting paths are created between the illumination device 21 and the LCOS microdisplay element 25, and a plurality of imaging paths are created between the LCOS microdisplay element 25 and the optical projection lens 26. The electronic image is then projected onto a screen 9 through the optical projection lens 26.

Please refer to FIG. 2 again. The source ray provided by the illumination device 21 may be divided into two parts, i.e. P-polarized lighting beams $L_{2P}$ and S-polarized lighting beams $L_{2P}$. The P-polarized lighting beams $L_{2P}$ and the S-polarized lighting beams $L_{2S}$ are propagated along the corresponding lighting paths. The solid lines as shown in FIG. 2 denote some of the lighting paths, i.e. the transmission paths of the lighting beams ($L_{2P}$+$L_{2S}$).

After the source ray ($L_{2P}$+$L_{2S}$) provided by the illumination device 21 is transmitted through the collimating lens assembly 22 and directed to the reflective polarizer 23, the S-polarized lighting beams $L_{2S}$ are reflected to other places (not shown). The P-polarized lighting beams $L_{2P}$ are sequentially transmitted through the reflective polarizer 23 and the field lens 24, and directed to the LCOS microdisplay element 25. Next, the P-polarized lighting beams $L_{2P}$ are reflected by the LCOS microdisplay element 25. Correspondingly, the P-polarized lighting beams $L_{2P}$ are converted into a plurality of S-polarized imaging beams $I_{2S}$ in response to the electronic image. The S-polarized imaging beams $I_{2S}$ are propagated along the corresponding imaging paths. The dotted lines as shown in FIG. 2 denote some of the imaging paths, i.e. the transmission paths of the S-polarized imaging beams $I_{2S}$.

The S-polarized imaging beams $I_{2S}$ from the LCOS microdisplay element 25 are transmitted through the field lens 24, and directed to the reflective polarizer 23. Next, the S-polarized imaging beams $I_{2S}$ are reflected by the reflective polarizer 23, and directed to the optical projection lens 26 through the analyzer 28. Consequently, the electronic image shown on the LCOS microdisplay element 25 is projected onto the screen 9 through the optical projection lens 26.

From the above discussions, the P-polarized lighting beams $L_{2P}$ are transmissible through the reflective polarizer 23, and the S-polarized imaging beams $I_{2S}$ are reflected by the reflective polarizer 23. However, the reflectivity and the transmissivity of the reflective polarizer 23 are not ideally 100%. In other words, a portion of the P-polarized lighting beams $L_{2P}$ incident to the reflective polarizer 23 are transmitted through the reflective polarizer 23 and directed to the LCOS microdisplay element 25. Whereas, the rest of the P-polarized lighting beams $L_{2P}$ are consumed or lost. In addition, a portion of the S-polarized imaging beams $I_{2S}$ incident to the reflective polarizer 23 are reflected by the reflective polarizer 23 and directed to the optical projection lens 26. Whereas, the rest of the S-polarized imaging beams $I_{2S}$ are consumed or lost. That is, the light amount outputted from the optical projection lens 26 is much lower than the light amount outputted from the illumination device 21.

From the above discussions, one of the main drawbacks of the conventional LCOS projection system is the low light utilization efficacy of the source ray provided by the illumination device. Consequently, the projection system outputs insufficient luminance and fails to meet the user's requirements. Recently, the LCOS projection system is gradually replaced by a digital light processing (DLP) projection system.

Therefore, there is a need of providing an improved LCOS projection system with enhanced light utilization efficacy.

SUMMARY OF THE INVENTION

The present invention relates to a LCOS (liquid crystal on silicon) projection system, and more particularly to a LCOS projection system with enhanced light utilization efficacy.

In accordance with an aspect of the present invention, there is provided a projection system. The projection system includes an illumination device, a LCOS (liquid crystal on silicon) microdisplay element, an optical projection lens, and an optical processing module. The illumination device is used for providing a source ray including a plurality of lighting beams in a first polarization state and a plurality of lighting beams in a second polarization state. The LCOS microdisplay element is used for showing an electronic image. When the lighting beams in the first polarization state are directed to the LCOS microdisplay element, the lighting beams in the first polarization state are reflected by the LCOS microdisplay element, and the lighting beams in the first polarization state are converted into a plurality of imaging beams in the second polarization state in response to the electronic image. The optical projection lens is for receiving and projecting the imaging beams in the second polarization state onto a screen. The optical processing module is arranged between the illumination device, the LCOS microdisplay element and the optical projection lens. When the source ray is received by the optical processing module, the lighting beams of the source ray in the second polarization state are filtered off, and the lighting beams of the source ray in the first polarization state are outputted from the optical processing module to the LCOS microdisplay element. The imaging beams in the second polarization state are received by the optical processing module and outputted to the optical projection lens. The optical processing module at least includes a total internal reflection prism and a polarizer. The lighting beams in the second polarization state are blocked by the polarizer.

In an embodiment, the total internal reflection prism includes a first prism and a second prism. The first prism includes a lighting beam incidence plane and a first facing plane. The second prism includes an imaging beam emergence plane, a second facing plane, and a second prism plane arranged between the imaging beam emergence plane and the second facing plane. The first facing plane and the second facing plane are separated from each other by a gap.

In an embodiment, the projection system further includes an analyzer. The analyzer is arranged between the imaging beam emergence plane of the second prism and the optical projection lens for blocking any beam in the first polarization state from being directed to the optical projection lens.

In an embodiment, the optical processing module further includes a collimating lens assembly and a field lens. The collimating lens assembly is arranged between the illumination device and the total internal reflection prism for adjusting an incidence angle of any received lighting beam in the first polarization state and outputting the adjusted lighting beam, and adjusting an incidence angle of any received lighting beam in the second polarization state and outputting the adjusted. The field lens is arranged between the total internal reflection prism and the LCOS microdisplay element for adjusting an incidence angle of any received lighting beam in the first polarization state and outputting the adjusted lighting beam, and adjusting an incidence angle of any received imaging beam in the second polarization state and outputting the adjusted imaging beam.

In an embodiment, after the imaging beams in the second polarization state are at least transmitted through the second prism plane of the second prism, the imaging beams in the second polarization state are directed to and reflected by the second facing plane of the second prism, and the reflected imaging beams in the second polarization state are at least transmitted through the imaging beam emergence plane of the second prism and directed to the optical projection lens.

In an embodiment, the polarizer is arranged between the first facing plane of the first prism and the second facing plane of the second prism. After the lighting beams in the first polarization state are at least sequentially transmitted through the lighting beam incidence plane of the first prism, the first facing plane of the first prism, the polarizer, the second facing plane of the second prism and the second prism plane of the second prism, the lighting beams in the first polarization state are directed to the LCOS microdisplay element. Alternatively, the polarizer is arranged between the illumination device and the lighting beam incidence plane of the first prism. After the lighting beams in the first polarization state are at least sequentially transmitted through the polarizer, the lighting beam incidence plane of the first prism, the first facing plane of the first prism, the second facing plane of the second prism and the second prism plane of the second prism, the lighting beams in the first polarization state are directed to the LCOS microdisplay element.

In an embodiment, if the polarizer is arranged between the first facing plane of the first prism and the second facing plane of the second prism, the polarizer is attached on the first facing plane of the first prism, or the polarizer is separated from the first facing plane of the first prism. Whereas, if the polarizer is arranged between the illumination device and the lighting beam incidence plane of the first prism, the polarizer is attached on the lighting beam incidence plane of the first prism, or the polarizer is separated from the lighting beam incidence plane of the first prism.

In an embodiment, the projection system has a lighting optical axis, a first angle between the first facing plane of the first prism and the lighting optical axis is in a range between 20 degrees and 70 degrees, and a second angle between the second facing plane of the second prism and the lighting optical axis is 45 degrees. Alternatively, the projection system has a lighting optical axis, a second angle between the second facing plane of the second prism and the lighting optical axis is 45 degrees, and the first facing plane of the first prism is parallel with the second facing plane of the second prism.

In an embodiment, the polarizer is a reflective polarizer or an absorptive polarizer, the first polarization state is a P-polarized state, and the second polarization state is an S-polarized state. Each of the first prism and the second prism has a refractive index in a range between 1.41 and 2.2, or the first prism is a triangular prism or a thin flat glass, or an area of the first facing plane of the first prism is greater than an area of the second facing plane of the second prism.

In an embodiment, the first prism further includes a first prism plane arranged between the lighting beam incidence plane and the first facing plane, and the polarizer is arranged between the illumination device and the lighting beam incidence plane of the first prism. After the lighting beams in the first polarization state are at least transmitted through the polarizer and the lighting beam incidence plane of the first prism, the lighting beams in the first polarization state are directed to and reflected by the first facing plane of the first prism, and the reflected lighting beams in the first polarization state are at least transmitted through the first prism plane of the first prism and directed to the LCOS microdisplay element. After the imaging beams in the second polarization state are at least sequentially transmitted through the first prism plane of the first prism, the first facing plane of the first prism, the second facing plane of the second prism and the imaging beam emergence plane of the second prism, the imaging beams in the second polarization state are directed to the optical projection lens.

In an embodiment, the projection system has a lighting optical axis, a first angle is defined between the first facing plane of the first prism and the lighting optical axis, a second angle is defined between the second facing plane of the second prism and the lighting optical axis, and a sum of the first angle and the second angle is equal to 90 degrees. Alternatively, the projection system has a lighting optical axis, a first angle is defined between the first facing plane of the first prism and the lighting optical axis is 45 degrees, and a second angle is defined between the second facing plane of the second prism and the lighting optical axis is 45 degrees.

In an embodiment, the polarizer is attached on the lighting beam incidence plane of the first prism, or the polarizer is separated from the lighting beam incidence plane of the first prism.

In an embodiment, the polarizer is an absorptive polarizer, the first polarization state is an S-polarized state, and the second polarization state is a P-polarized state. Each of the first prism and the second prism has an identical refractive index in a range between 1.41 and 2.2, or the gap between the first facing plane and the second facing plane is smaller than 0.1 mm, or an area of the second facing plane of the second prism is greater than an area of the first facing plane of the first prism.

In accordance with another aspect of the present invention, there is provided a projection system. The projection system includes a LCOS (liquid crystal on silicon) microdisplay element, a total internal reflection prism, a polarizer, and an illumination device. The LCOS microdisplay element is used for showing an electronic image. The optical projection lens is used for receiving and projecting the imaging beams in the second polarization state onto a screen. The illumination device is used for providing a source ray to the LCOS microdisplay element, creating a plurality of lighting paths between the illumination device and the LCOS microdisplay element, and creating a plurality of imaging paths between the LCOS microdisplay element and the optical projection lens, so that the electronic image is projected onto a screen through the optical projection lens. The lighting paths and the imaging paths are determined according to the total internal reflection prism, and the polarizer is only located in the lighting paths for blocking any lighting beam of the source ray in a specified polarization state from being directed to the LCOS microdisplay element.

In an embodiment, the source ray includes a plurality of lighting beams in a first polarization state and a plurality of lighting beams in a second polarization state, and the lighting beams in the first polarization state and the lighting beams in the second polarization state are propagated along the lighting paths. The lighting beams in the second polarization state are blocked by the polarizer. When the lighting beams in the first polarization state are directed to and reflected by the LCOS microdisplay element, the lighting beams are converted into a plurality of imaging beams in the second polarization state in response to the electronic image. The imaging beams in the second polarization state are propagated along the imaging paths.

In an embodiment, the total internal reflection prism includes a first prism and a second prism. The first prism includes a lighting beam incidence plane and a first facing plane. The second prism includes an imaging beam emergence plane, a second facing plane, and a second prism plane arranged between the imaging beam emergence plane and the second facing plane. The first facing plane and the second facing plane are separated from each other by a gap.

In an embodiment, the projection system further includes an analyzer. The analyzer is arranged between the imaging beam emergence plane of the second prism and the optical projection lens for blocking any beam in the first polarization state from being directed to the optical projection lens.

In an embodiment, the projection system further includes a collimating lens assembly and a field lens. The collimating lens assembly is arranged between the illumination device and the total internal reflection prism for adjusting an incidence angle of any received lighting beam in the first polarization state and outputting the adjusted lighting beam, and adjusting an incidence angle of any received lighting beam in the second polarization state and outputting the adjusted. The field lens is arranged between the total internal reflection prism and the LCOS microdisplay element for adjusting an incidence angle of any received lighting beam in the first polarization state and outputting the adjusted lighting beam, and adjusting an incidence angle of any received imaging beam in the second polarization state and outputting the adjusted imaging beam.

In an embodiment, after the imaging beams in the second polarization state are at least transmitted through the second prism plane of the second prism, the imaging beams in the second polarization state are directed to and reflected by the second facing plane of the second prism, and the reflected imaging beams in the second polarization state are at least transmitted through the imaging beam emergence plane of the second prism and directed to the optical projection lens.

In an embodiment, the polarizer is arranged between the first facing plane of the first prism and the second facing plane of the second prism. After the lighting beams in the first polarization state are at least sequentially transmitted through the lighting beam incidence plane of the first prism, the first facing plane of the first prism, the polarizer, the second facing plane of the second prism and the second prism plane of the second prism, the lighting beams in the first polarization state are directed to the LCOS microdisplay element. Alternatively, the polarizer is arranged between the illumination device and the lighting beam incidence plane of the first prism. After the lighting beams in the first polarization state are at least sequentially transmitted through the polarizer, the lighting beam incidence plane of the first prism, the first facing plane of the first prism, the second facing plane of the second prism and the second prism plane of the second prism, the lighting beams in the first polarization state are directed to the LCOS microdisplay element.

In an embodiment, if the polarizer is arranged between the first facing plane of the first prism and the second facing plane of the second prism, the polarizer is attached on the first facing plane of the first prism, or the polarizer is separated from the first facing plane of the first prism. Whereas, if the polarizer is arranged between the illumination device and the lighting beam incidence plane of the first prism, the polarizer is attached on the lighting beam incidence plane of the first prism, or the polarizer is separated from the lighting beam incidence plane of the first prism.

In an embodiment, the projection system has a lighting optical axis, a first angle between the first facing plane of the first prism and the lighting optical axis is in a range between 20 degrees and 70 degrees, and a second angle between the second facing plane of the second prism and the lighting optical axis is 45 degrees. Alternatively, the projection system has a lighting optical axis, a second angle between the second facing plane of the second prism and the lighting optical axis is 45 degrees, and the first facing plane of the first prism is parallel with the second facing plane of the second prism.

In an embodiment, the polarizer is a reflective polarizer or an absorptive polarizer, the first polarization state is a P-polarized state, and the second polarization state is an S-polarized state. Each of the first prism and the second prism has a refractive index in a range between 1.41 and 2.2, or the first prism is a triangular prism or a thin flat glass, or an area of the first facing plane of the first prism is greater than an area of the second facing plane of the second prism.

In an embodiment, the first prism further includes a first prism plane arranged between the lighting beam incidence plane and the first facing plane, and the polarizer is arranged between the illumination device and the lighting beam incidence plane of the first prism. After the lighting beams in the first polarization state are at least transmitted through the polarizer and the lighting beam incidence plane of the first prism, the lighting beams in the first polarization state are directed to and reflected by the first facing plane of the first prism, and the reflected lighting beams in the first polarization state are at least transmitted through the first prism plane of the first prism and directed to the LCOS microdisplay element. After the imaging beams in the second polarization state are at least sequentially transmitted through the first prism plane of the first prism, the first facing plane of the first prism, the second facing plane of the second prism and the imaging beam emergence plane of the second prism, the imaging beams in the second polarization state are directed to the optical projection lens.

In an embodiment, the projection system has a lighting optical axis, a first angle is defined between the first facing plane of the first prism and the lighting optical axis, a second angle is defined between the second facing plane of the second prism and the lighting optical axis, and a sum of the first angle and the second angle is equal to 90 degrees. Alternatively, the projection system has a lighting optical axis, a first angle is defined between the first facing plane of the first prism and the lighting optical axis is 45 degrees, and a second angle is defined between the second facing plane of the second prism and the lighting optical axis is 45 degrees.

In an embodiment, the polarizer is attached on the lighting beam incidence plane of the first prism, or the polarizer is separated from the lighting beam incidence plane of the first prism.

In an embodiment, the polarizer is an absorptive polarizer, the first polarization state is an S-polarized state, and the second polarization state is a P-polarized state. Each of the first prism and the second prism has an identical refractive index in a range between 1.41 and 2.2, or the gap between the first facing plane and the second facing plane is smaller than 0.1 mm, or an area of the second facing plane of the second prism is greater than an area of the first facing plane of the first prism.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
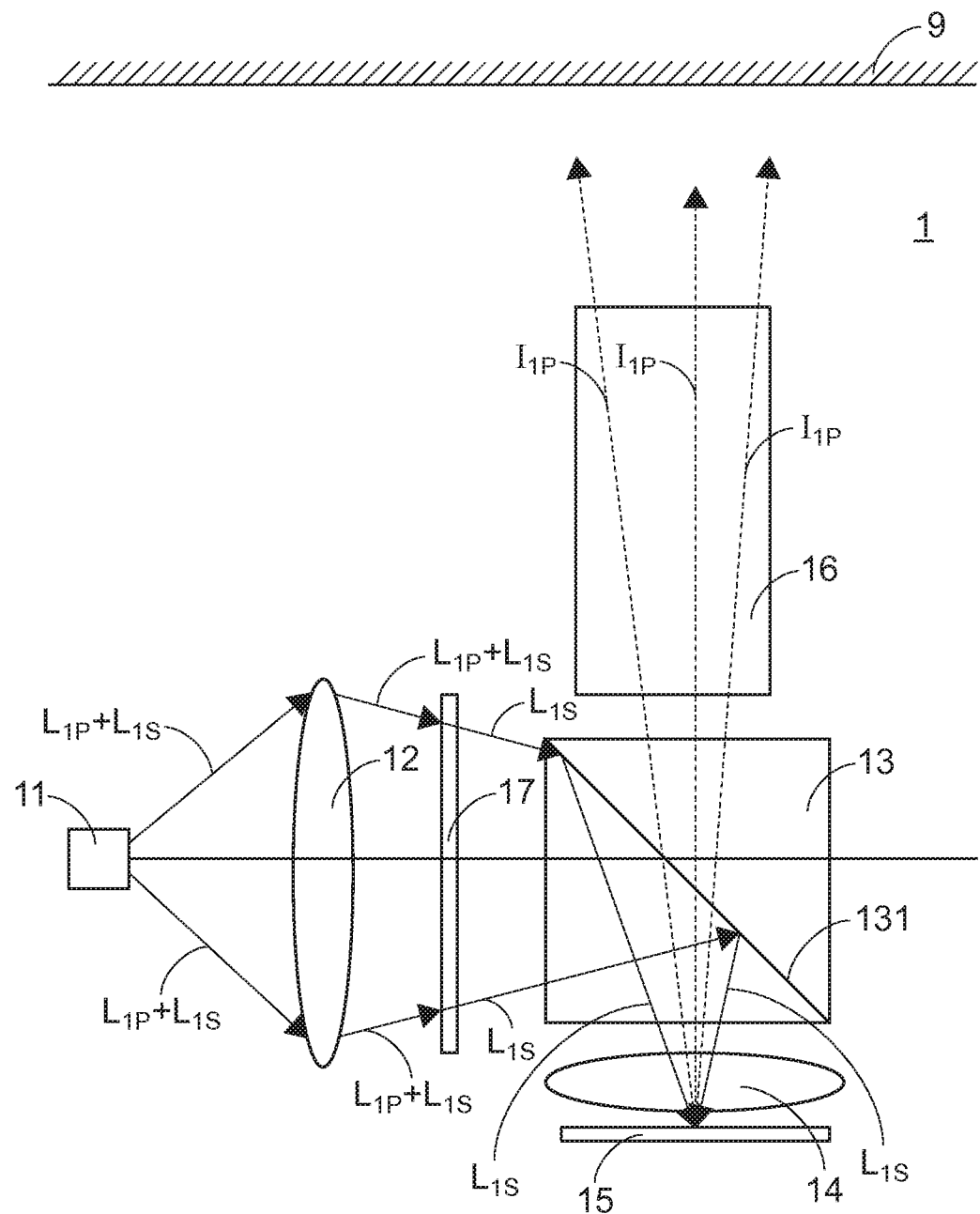
FIG. 1 is a schematic view illustrating the structure and the optical paths of a conventional LCOS projection system.
Figure 2:
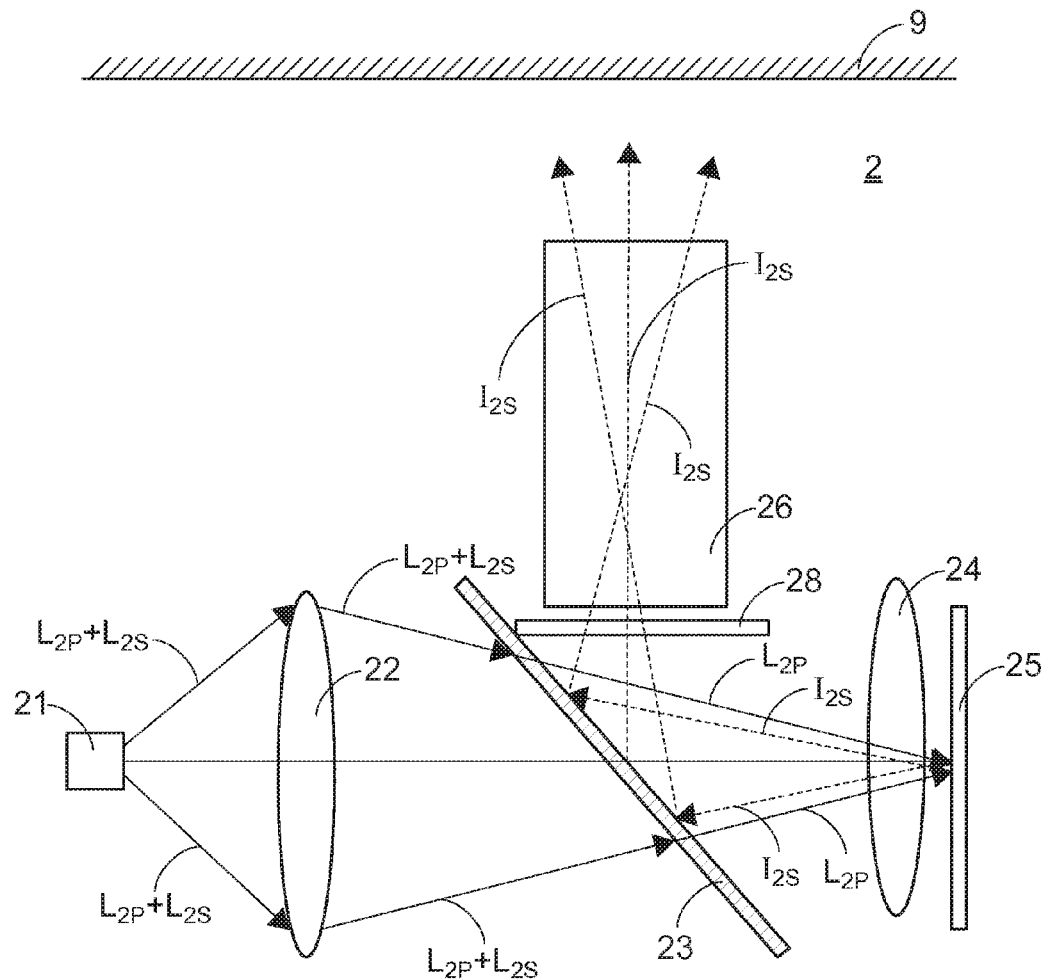
FIG. 2 is a schematic view illustrating the structure and the optical paths of another conventional LCOS projection system.
Figure 3:
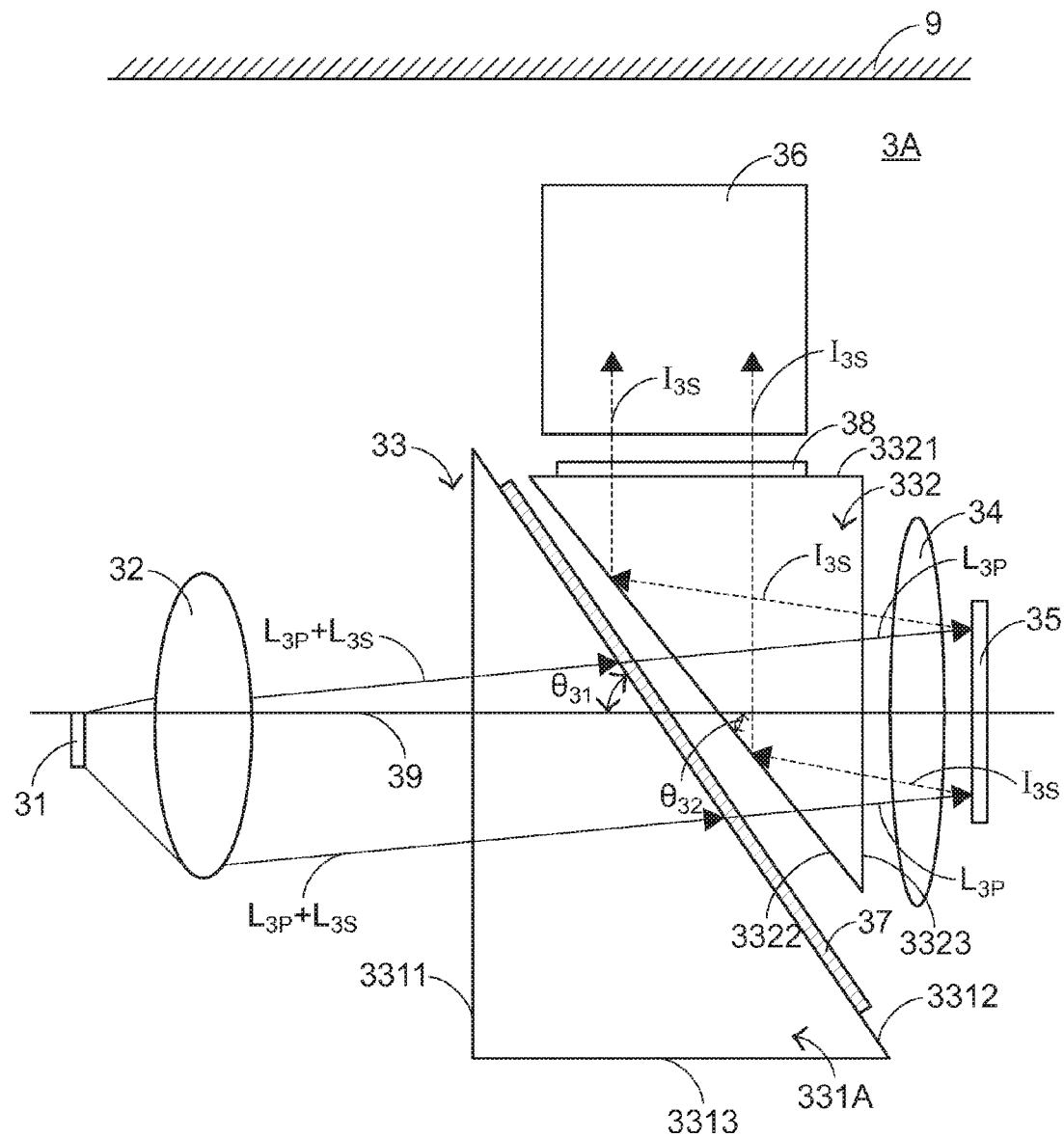
FIG. 3 is a schematic view illustrating the structure and the optical paths of a projection system according to a first embodiment of the present invention.

FIG. 3 is a schematic view illustrating the structure and the optical paths of a LCOS projection system according to a first embodiment of the present invention. As shown in FIG. 3, the projection system 3A comprises an illumination device 31, a collimating lens assembly 32, a polarizer 37, a total internal reflection (TIR) prism 33, a field lens 34, a LCOS microdisplay element 35, an analyzer 38, and an optical projection lens 36. The total internal reflection prism 33 is arranged between the illumination device 31, the LCOS microdisplay element 35 and the optical projection lens 36. The polarizer 37 is disposed within the total internal reflection prism 33. The collimating lens assembly 32 is arranged between the illumination device 31 and the total internal reflection prism 33. The field lens 34 is arranged between the total internal reflection prism 33 and the LCOS microdisplay element 35. The analyzer 38 is arranged between the total internal reflection prism 33 and the optical projection lens 36.

In this embodiment, the total internal reflection prism 33 comprises a first prism 331A and a second prism 332. The first prism 331A and the second prism 332 are both triangular prisms. The first prism 331A comprises a lighting beam incidence plane 3311, a first facing plane 3312, and a first prism plane 3313. The first prism plane 3313 is arranged between the lighting beam incidence plane 3311 and the first facing plane 3312. The second prism 332 comprises an imaging beam emergence plane 3321, a second facing plane 3322, and a second prism plane 3323. The second prism plane 3323 is arranged between the imaging beam emergence plane 3321 and the second facing plane 3322. The first facing plane 3312 of the first prism 331A and the second facing plane 3322 of the second prism 332 face each other, and are separated from each other by a gap. It is preferred that the refractive index of each of the first prism 331A and the second prism 332 is in the range between 1.41 and 2.2. In this embodiment, the refractive index of the first prism 331A and the refractive index of the second prism 332 are different from each other (but are not limited to be different from each other).

The collimating lens assembly 32 and the field lens 34 are used for adjusting the incidence angles of the received light beams and outputting the adjusted light beams. The analyzer 38 is used for blocking the P-polarized beams in order to filter off undesired light beams and prevent the undesired light beams from being directed to the optical projection lens 36. In addition, only the S-polarized beams are transmissible through the analyzer 38. It is noted that the analyzer 38 is not an essential component in this embodiment.

Moreover, the polarizer 37 is a reflective polarizer or an absorptive polarizer for blocking the S-polarized beams. In addition, only the P-polarized beams are transmissible through the polarizer 37. In a case that the polarizer 37 is the reflective polarizer, the S-polarized beams are reflected by the polarizer 37. Whereas, in a case that the polarizer 37 is the absorptive polarizer, the S-polarized beams are absorbed by the polarizer 37. In this embodiment, the polarizer 37 is attached on the first facing plane 3312 of the first prism 331A. It is noted that the location of the polarizer 37 relative to the first prism 331A may be altered according to the practical requirements. For example, the polarizer 37 may be separated from the first facing plane 3312 of the first prism 331A.

Moreover, the LCOS microdisplay element 35 is used for showing an electronic image. The illumination device 31 is used for providing a source ray to the LCOS microdisplay element 35. Consequently, a lighting optical axis 39 and a plurality of lighting paths are created between the illumination device 31 and the LCOS microdisplay element 35, and a plurality of imaging paths are created between the LCOS microdisplay element 35 and the optical projection lens 36. The electronic image is then projected onto a screen 9 through the optical projection lens 36. Especially, the total internal reflection prism 33 is an important factor influencing the lighting paths and the imaging paths.

Please refer to FIG. 3 again. The source ray provided by the illumination device 31 may be divided into two parts, i.e. P-polarized lighting beams $L_{3P}$ and S-polarized lighting beams $L_{3S}$. The P-polarized lighting beams $L_{3P}$ and the S-polarized lighting beams $L_{3S}$ are propagated along the corresponding lighting paths. The solid lines as shown in FIG. 3 denote some of the lighting paths, i.e. the transmission paths of the lighting beams ($L_{3P}+L_{3S}$).

After the source ray ($L_{3P}+L_{3S}$) provided by the illumination device 31 is sequentially transmitted through the collimating lens assembly 32, the lighting beam incidence plane 3311 of the first prism 331A and the first facing plane 3312 of the first prism 331A and directed to the polarizer 37, the S-polarized lighting beams $L_{3S}$ are reflected to other places or absorbed by the polarizer 37. Whereas, the P-polarized lighting beams $L_{3P}$ are continuously transmitted through the polarizer 37, the second facing plane 3322 of the second prism 332, the second prism plane 3323 of the second prism 332 and the field lens 34, and then directed to the LCOS microdisplay element 35. Next, the P-polarized lighting beams $L_{3P}$ are reflected by the LCOS microdisplay element 35. Correspondingly, P-polarized lighting beams $L_{3P}$ are converted into a plurality of S-polarized imaging beams $I_{3S}$ in response to the electronic image. The S-polarized imaging beams $I_{3S}$ are propagated along the corresponding imaging paths. The dotted lines as shown in FIG. 3 denote some of the imaging paths, i.e. the transmission paths of the S-polarized imaging beams $I_{3S}$.

The S-polarized imaging beams $I_{3S}$ from the LCOS microdisplay element 35 are sequentially transmitted through the field lens 34 and the second prism plane 3323 of the second prism 332, and directed to the second facing plane 3322 of the second prism 332. When the S-polarized imaging beams $I_{3S}$ strike the second facing plane 3322 of the second prism 332, the total internal reflection occurs. The reflected S-polarized imaging beams $I_{3S}$ are sequentially transmitted through the imaging beam emergence plane 3321 of the second prism 332 and the analyzer 38, and then directed to the optical projection lens 36. Consequently, the electronic image shown on the LCOS microdisplay element 35 is projected onto the screen 9 through the optical projection lens 36.

The concepts of the present invention may be further illustrated by referring to Snell's law. That is, if any P-polarized lighting beam $L_{3P}$ is incident to the second facing plane 3322 of the second prism 332 at an incidence angle within a specified range, the lighting beam $L_{3P}$ can be transmitted through the second facing plane 3322 of the second prism 332. Whereas, if the incidence angle is beyond the specified range, the total internal reflection occurs on the second facing plane 3322 of the second prism 332. On the other hand, if any S-polarized imaging beam $I_{3S}$ is incident to the second facing plane 3322 of the second prism 332 at an incidence angle within a specified range, the total internal reflection occurs on the second facing plane 3322 of the second prism 332. Whereas, if the incidence angle is beyond the specified range, the S-polarized imaging beam $I_{3S}$ is transmitted through the second facing plane 3322 of the second prism 332. The operating principles of the Snell's law are well known to those skilled in the art, and are not redundantly described herein.

In other words, if any P-polarized lighting beam $L_{3P}$ is subject to the total internal reflection on the second facing plane 3322 of the second prism 332 or any S-polarized imaging beam $I_{3S}$ is transmitted through the second facing plane 3322 of the second prism 332, the light loss problem occurs. For solving the light loss problem, the relative position between the collimating lens assembly 32 and the field lens 34 or the relative position between any two components needs to be properly managed. In such way, the incidence angle of the P-polarized lighting beam $L_{3P}$ incident to the second facing plane 3322 of the second prism 332 and the S-polarized imaging beam $I_{3S}$ incident to the second facing plane 3322 of the second prism 332 are well adjusted. That is, the optimal lighting paths and the optimal imaging paths are achieved.

In accordance with the present invention, the reflectivity of the total internal reflection prism 33 is close to 100%. That is, the reflectivity of the total internal reflection prism 33 is higher than the reflectivity of the reflective polarizer 23 or the reflective polarizing film 131 of the conventional projection system, which has been described in the background of the present disclosure. In such way, if the S-polarized imaging beams $I_{3S}$ are incident to the second facing plane 3322 of the second prism 332 at a proper incidence angle and thus the total internal reflection occurs, almost 100% of the S-polarized imaging beams $I_{3S}$ are subject to the total internal reflection on the second facing plane 3322 of the second prism 332. The reflected S-polarized imaging beams $I_{3S}$ are directed to the optical projection lens 36.

In the projection system 3A of this embodiment, the light beams are only transmitted through the polarizer 37 once during the light beams travel along the optical path from the illumination device 31 to the optical projection lens 36. That is, the polarizer 37 is only located in the lighting paths of the projection system 3A. Moreover, due to the total internal reflection prism 33 of the projection system 3A, the S-polarized imaging beams $I_{3S}$ are subject to the total internal reflection on the second facing plane 3322 of the second prism 332. Consequently, the optical projection lens 36 of the projection system 3A can receive more S-polarized imaging beams $I_{3S}$ because of the total internal reflection. Assuming that the light amount from the illumination device of the conventional projection system and the light amount from the illumination device of the projection system 3A, the projection system 3A can output higher luminance than the conventional projection system.

Since the electronic image shown on the LCOS microdisplay element 35 is projected onto the screen 9 through the optical projection lens 36, the optical path lengths of any two imaging paths should be properly adjusted in order to minimize the optical aberration. In this embodiment, a first angle $\theta_{31}$ between the first facing plane 3312 of the first prism 331A and the lighting optical axis 39 is in the range between 20 degrees and 70 degrees. In addition, a second angle $\theta_{32}$ between the second facing plane 3322 of the second prism 332 and the lighting optical axis 39 is 45 degrees. In a case that the first facing plane 3312 of the first prism 331A has insufficient area, the lighting beams are possibly lost. For reducing the loss of the lighting beams, the area of the first facing plane 3312 of the first prism 331A is greater than the area of the second facing plane 3322 of the second prism 332.

Figure 4:
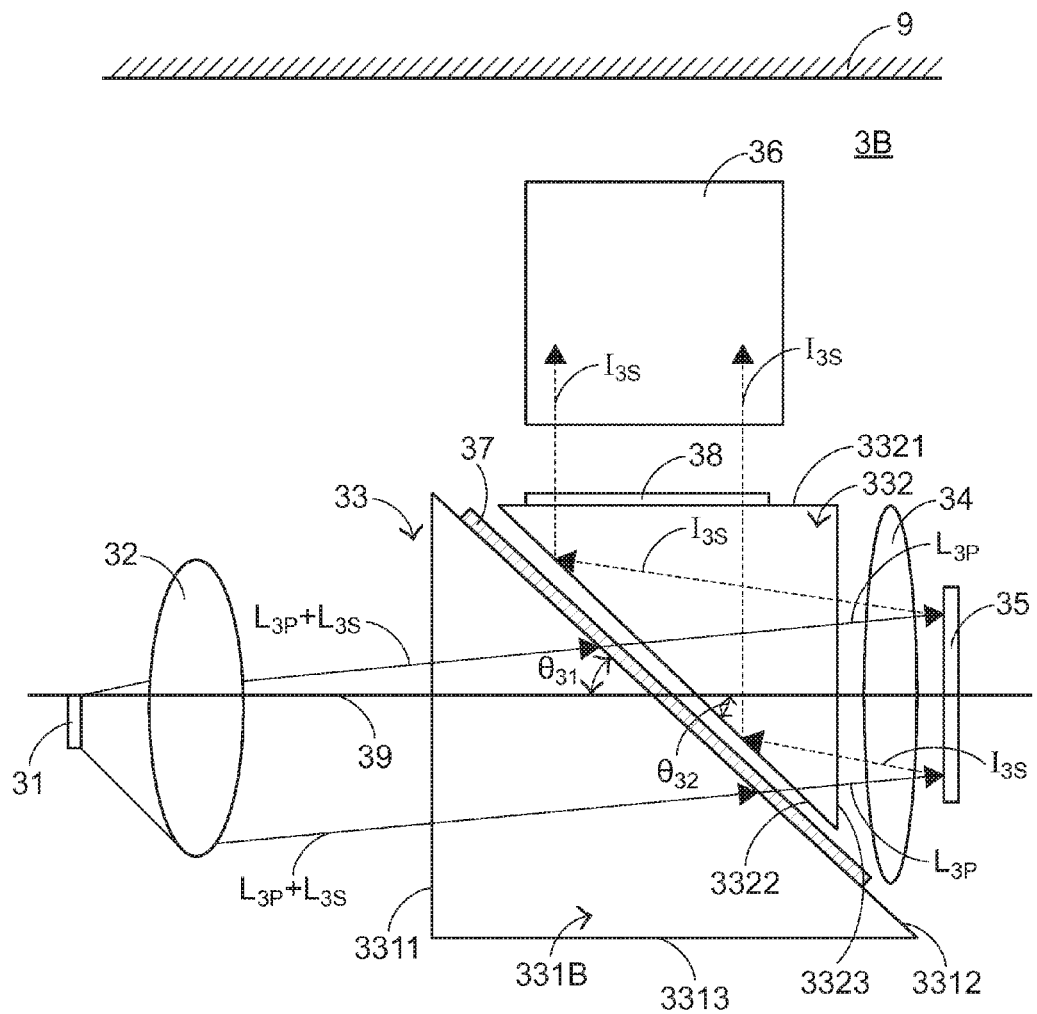
FIG. 4 is a schematic view illustrating the structure and the optical paths of a projection system according to a second embodiment of the present invention.

FIG. 4 is a schematic view illustrating the structure and the optical paths of a LCOS projection system according to a second embodiment of the present invention. The components of the projection system 3B are substantially identical to those of the projection system 3A of the first embodiment, and are not redundantly described herein. In this embodiment, the first angle $\theta_{31}$ between the first facing plane 3312 of the first prism 331B and the lighting optical axis 39 is 45 degrees, and the second angle $\theta_{32}$ between the second facing plane 3322 of the second prism 332 and the lighting optical axis 39 is also 45 degrees. In such way, when the electronic image shown on the LCOS microdisplay element 35 is projected onto the screen 9, the optical aberration is minimized.

Figure 5:
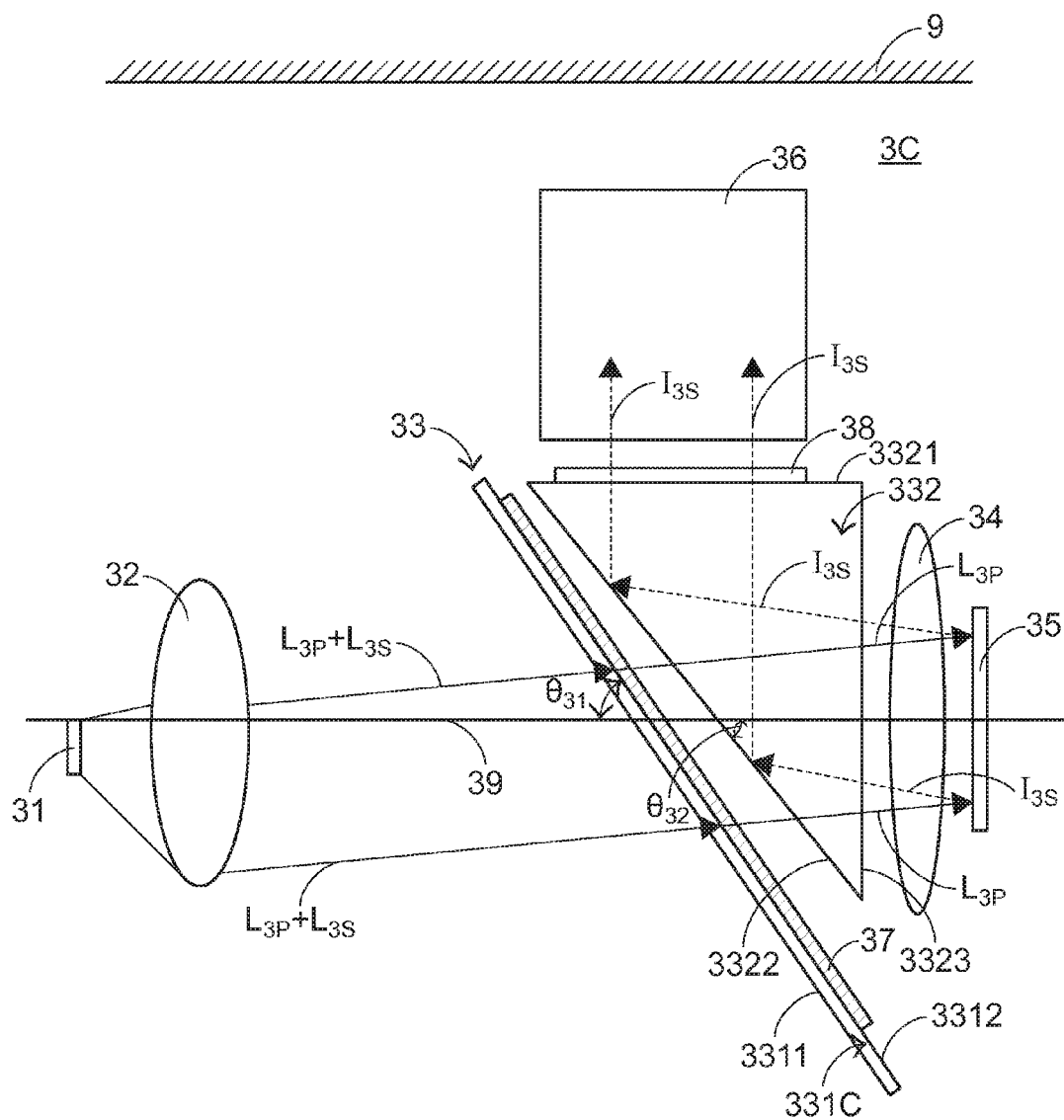
FIG. 5 is a schematic view illustrating the structure and the optical paths of a projection system according to a third embodiment of the present invention.

FIG. 5 is a schematic view illustrating the structure and the optical paths of a LCOS projection system according to a third embodiment of the present invention. Except that the first prism 331C is a thin flat glass, the other components of the projection system 3C of this embodiment are substantially identical to those of the projection system of the first embodiment, and are not redundantly described herein.

Figure 6:
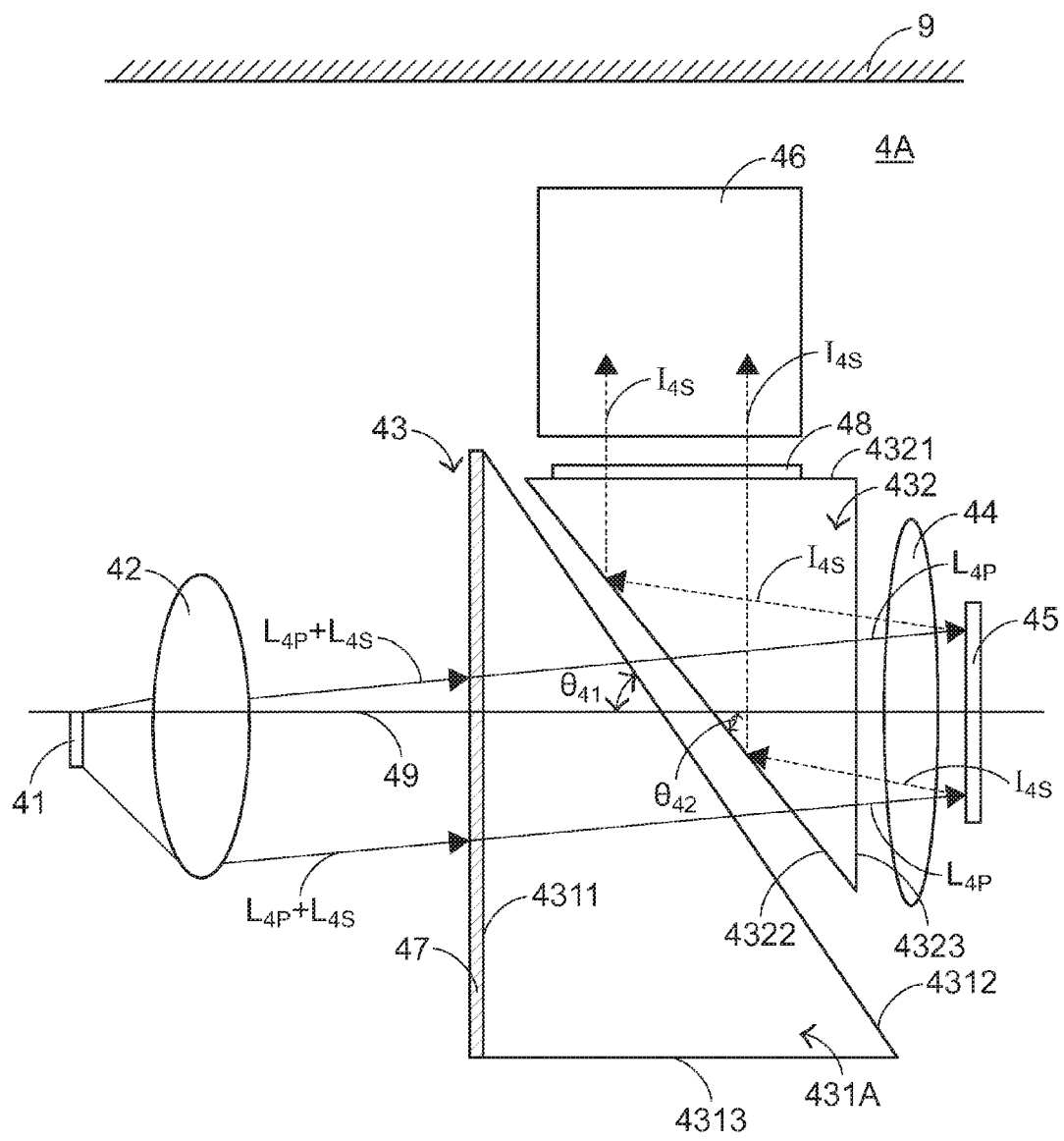
FIG. 6 is a schematic view illustrating the structure and the optical paths of a projection system according to a fourth embodiment of the present invention.

FIG. 6 is a schematic view illustrating the structure and the optical paths of a LCOS projection system according to a fourth embodiment of the present invention. Except that the polarizer 47 is arranged between the collimating lens assembly 42 and the total internal reflection prism 43 and the polarizer 42 is attached on the lighting beam incidence plane 4311 of the first prism 431A, the other components of the projection system 4A of this embodiment are substantially identical to those of the projection system of the first embodiment, and are not redundantly described herein.

In this embodiment, the source ray provided by the illumination device 41 may be divided into two parts, i.e. P-polarized lighting beams $L_{4P}$ and S-polarized lighting beams $L_{4S}$. The P-polarized lighting beams $L_{4P}$ and the S-polarized lighting beams $L_{4S}$ are propagated along the corresponding lighting paths. The solid lines as shown in FIG. 6 denote some of the lighting paths, i.e. the transmission paths of the lighting beams ($L_{4P}+L_{4S}$).

After the source ray ($L_{4P}+L_{4S}$) provided by the illumination device 41 is sequentially transmitted through the collimating lens assembly 42 and directed to the polarizer 47, the S-polarized lighting beams $L_{4S}$ are reflected to other places or absorbed by the polarizer 47 (not shown). Whereas, the P-polarized lighting beams $L_{4P}$ are continuously transmitted through the polarizer 47, the lighting beam incidence plane 4311 of the first prism 431A, the first facing plane 4312 of the first prism 431A, the second facing plane 4322 of the second prism 432, the second prism plane 4323 of the second prism 432 and the field lens 44, and then directed to the LCOS microdisplay element 45. Next, the P-polarized lighting beams $L_{4P}$ are reflected by the LCOS microdisplay element 45. Correspondingly, the P-polarized lighting beams $L_{4P}$ are converted into a plurality of S-polarized imaging beams $I_{4S}$ in response to the electronic image. The S-polarized imaging beams $I_{4S}$ are propagated along the corresponding imaging paths. The dotted lines as shown in FIG. 6 denote some of the imaging paths, i.e. the transmission paths of the S-polarized imaging beams $I_{4S}$.

The S-polarized imaging beams $I_{4S}$ from the LCOS microdisplay element 45 are sequentially transmitted through the field lens 44 and the second prism plane 4323 of the second prism 432, and directed to the second facing plane 4322 of the second prism 432. When the S-polarized imaging beams $I_{4S}$ strike the second facing plane 4322 of the second prism 432, the total internal reflection occurs. The reflected S-polarized imaging beams $I_{4S}$ are sequentially transmitted through the imaging beam emergence plane 4321 of the second prism 432 and the analyzer 48, and then directed to the optical projection lens 46. Consequently, the electronic image shown on the LCOS microdisplay element 45 is projected onto the screen 9 through the optical projection lens 46.

Figure 7:
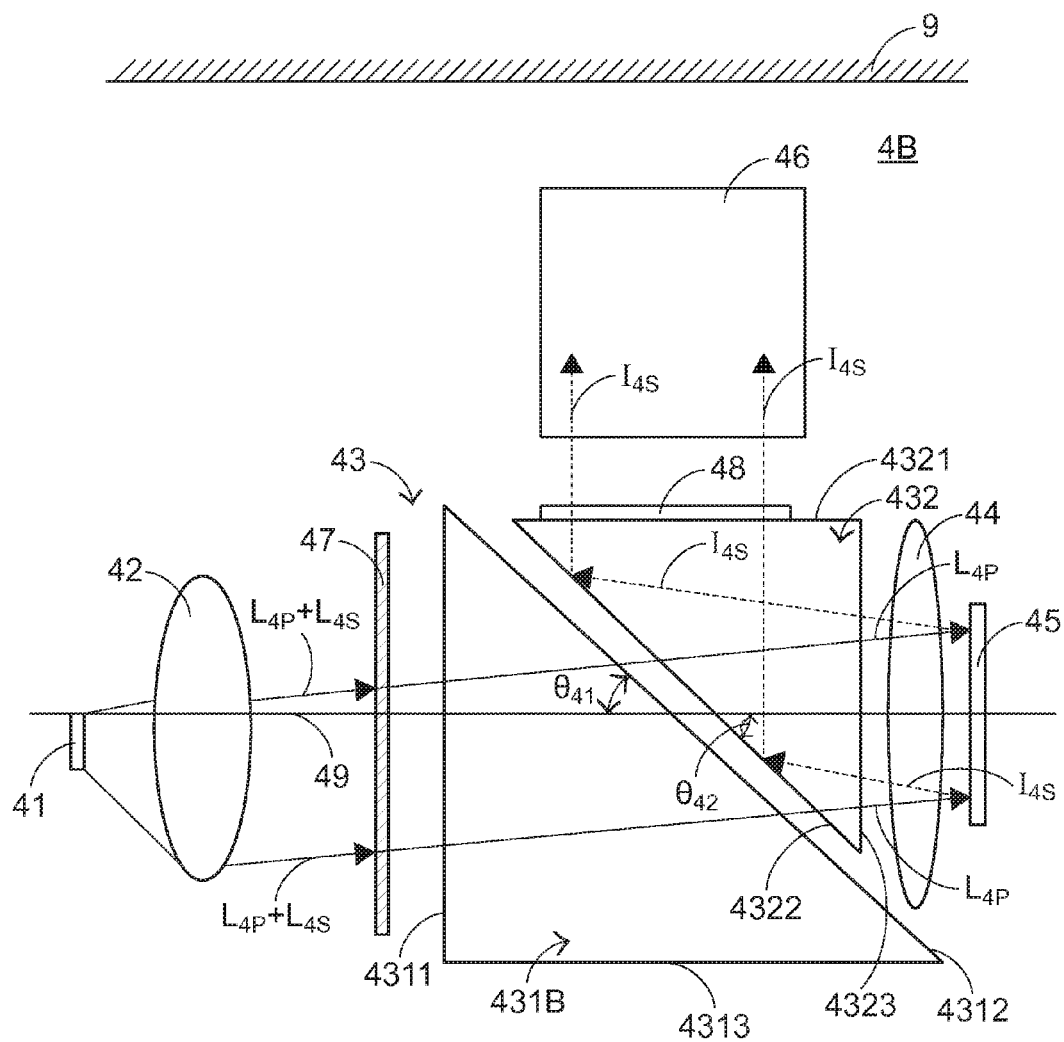
FIG. 7 is a schematic view illustrating the structure and the optical paths of a projection system according to a fifth embodiment of the present invention.

FIG. 7 is a schematic view illustrating the structure and the optical paths of a LCOS projection system according to a fifth embodiment of the present invention. The components of the projection system 4B of this embodiment are substantially identical to those of the projection system of the fourth embodiment, and are not redundantly described herein. In this embodiment, a first angle $\theta_{41}$ between the first facing plane 4312 of the first prism 431A and the lighting optical axis 49 is 45 degrees, and a second angle $\theta_{42}$ between the second facing plane 4322 of the second prism 432 and the lighting optical axis 49 is also 45 degrees. In such way, when the electronic image shown on the LCOS microdisplay element 45 is projected onto the screen 9, the optical aberration is minimized. Moreover, in comparison with the fourth embodiment, the polarizer 47 is separated from the lighting beam incidence plane 4311 of the first prism 431B according to this embodiment.

Figure 8:
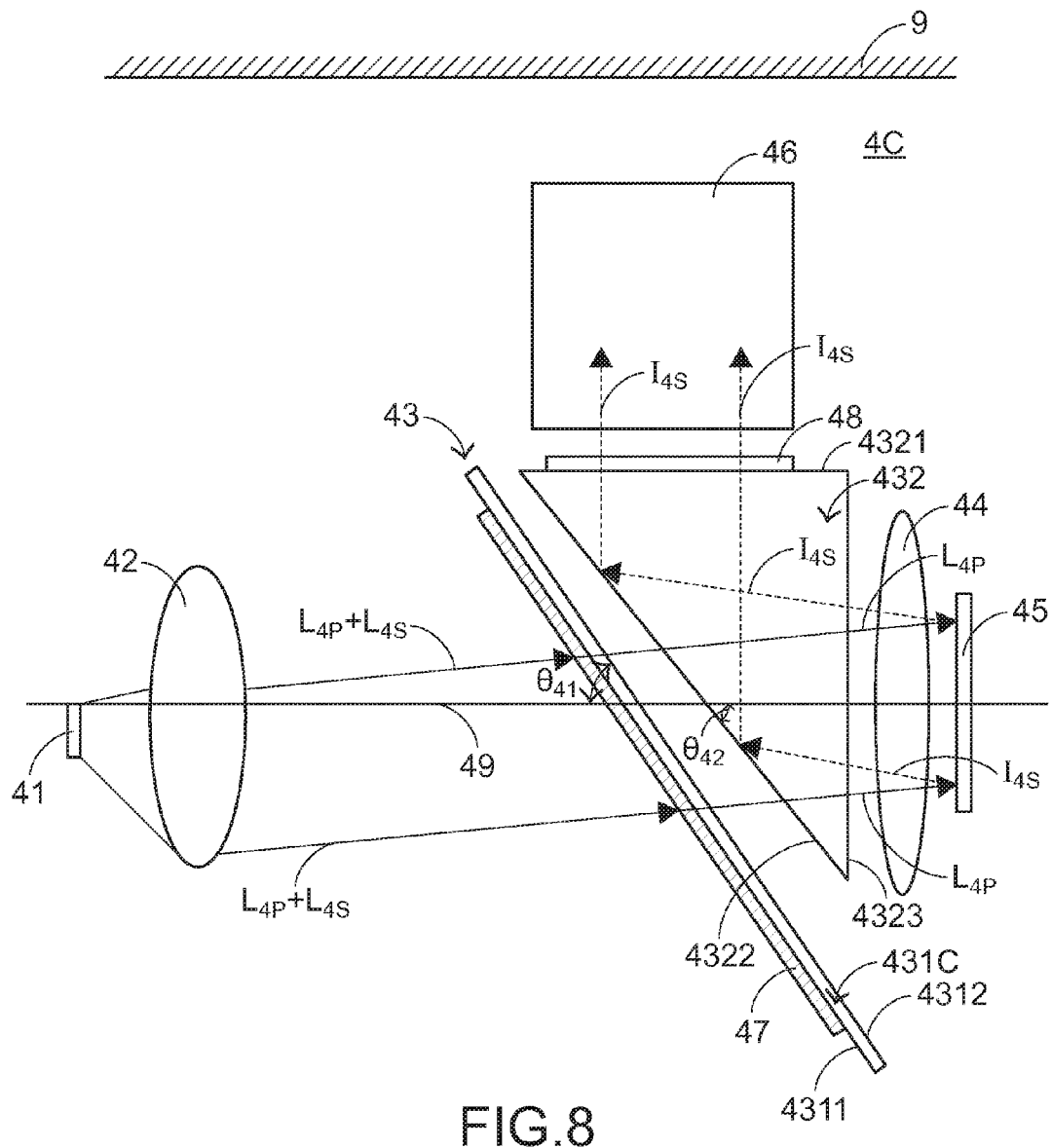
FIG. 8 is a schematic view illustrating the structure and the optical paths of a projection system according to a sixth embodiment of the present invention.

FIG. 8 is a schematic view illustrating the structure and the optical paths of a LCOS projection system according to a sixth embodiment of the present invention. Except that the first prism 431C is a thin flat glass, the other components of the projection system 4C of this embodiment are substantially identical to those of the projection system of the fourth embodiment, and are not redundantly described herein.

Figure 9:
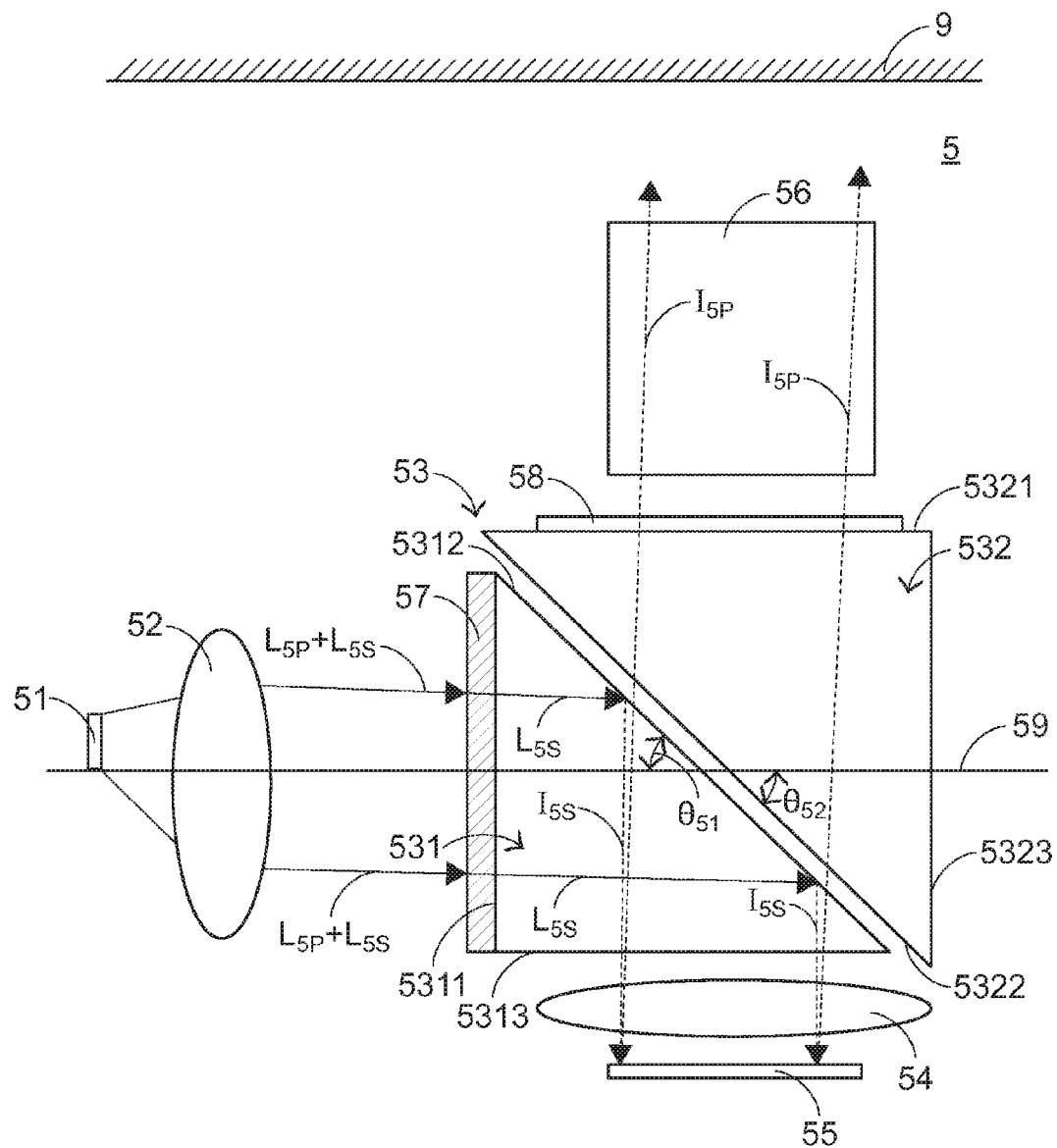
FIG. 9 is a schematic view illustrating the structure and the optical paths of a projection system according to a seventh embodiment of the present invention.

FIG. 9 is a schematic view illustrating the structure and the optical paths of a LCOS projection system according to a seventh embodiment of the present invention. As shown in FIG. 9, the projection system 5 comprises an illumination device 51, a collimating lens assembly 52, a polarizer 57, a total internal reflection (TIR) prism 53, a field lens 54, a LCOS microdisplay element 55, an analyzer 58, and an optical projection lens 56. The total internal reflection prism 53 is arranged between the illumination device 51, the LCOS microdisplay element 55 and the optical projection lens 56. The polarizer 57 is arranged between the illumination device 51 and the total internal reflection prism 53. The collimating lens assembly 52 is arranged between the illumination device 51 and the polarizer 57. The field lens 54 is arranged between the total internal reflection prism 53 and the LCOS microdisplay element 55. The analyzer 58 is arranged between the total internal reflection prism 53 and the optical projection lens 56.

In this embodiment, the total internal reflection prism 53 comprises a first prism 531 and a second prism 532. The first prism 531 and the second prism 532 are both triangular prisms. The first prism 531 comprises a lighting beam incidence plane 5311, a first facing plane 5312, and a first prism plane 5313. The first prism plane 5313 is arranged between the lighting beam incidence plane 5311 and the first facing plane 3312. The second prism 532 comprises an imaging beam emergence plane 5321, a second facing plane 5322, and a second prism plane 5323. The second prism plane 5323 is arranged between the imaging beam emergence plane 5321 and the second facing plane 5322. The first facing plane 5312 of the first prism 531 and the second facing plane 5322 of the second prism 532 face each other, and are separated from each other by a gap. It is preferred that the refractive index of each of the first prism 531 and the second prism 532 is in the range between 1.41 and 2.2. In this embodiment, the refractive index of the first prism 531 and the refractive index of the second prism 532 are identical to each other (but are not limited to be identical to each other).

Moreover, the collimating lens assembly 52 and the field lens 54 are used for adjusting the incidence angles of the received light beams and outputting the adjusted light beams. The analyzer 58 is used for blocking the S-polarized beams in order to filter off undesired light beams and prevent the undesired light beams from being directed to the optical projection lens 56. In addition, only the P-polarized beams are transmissible through the analyzer 58. It is noted that the analyzer 58 is not an essential component in this embodiment.

Moreover, the polarizer 57 is an absorptive polarizer for blocking the P-polarized beams because the P-polarized beams are absorbed by the polarizer 57. In addition, only the S-polarized beams are transmissible through the polarizer 57. In this embodiment, the polarizer 57 is attached on the lighting beam incidence plane 5311 of the first prism 531. It is noted that the location of the polarizer 37 relative to the first prism 531 may be altered according to the practical requirements. For example, the polarizer 57 may be separated from the lighting beam incidence plane 5311 of the first prism 531.

Moreover, the LCOS microdisplay element 55 is used for showing an electronic image. The illumination device 51 is used for providing a source ray to the LCOS microdisplay element 55. Consequently, a lighting optical axis 59 and a plurality of lighting paths are created between the illumination device 51 and the LCOS microdisplay element 55, and a plurality of imaging paths are created between the LCOS microdisplay element 55 and the optical projection lens 56. The electronic image is then projected onto a screen 9 through the optical projection lens 56. Especially, the total internal reflection prism 53 is an important factor influencing the lighting paths and the imaging paths.

Please refer to FIG. 9 again. The source ray provided by the illumination device 51 may be divided into two parts, i.e. P-polarized lighting beams $L_{5P}$ and S-polarized lighting beams $L_{5S}$. The P-polarized lighting beams $L_{5P}$ and the S-polarized lighting beams $L_{5S}$ are propagated along the corresponding lighting paths. The solid lines as shown in FIG. 9 denote some of the lighting paths, i.e. the transmission paths of the lighting beams ($L_{5P}+L_{5S}$).

After the source ray ($L_{5P}+L_{5S}$) provided by the illumination device 51 is sequentially transmitted through the collimating lens assembly 52 and directed to the polarizer 57, the P-polarized lighting beams $L_{5P}$ are absorbed by the polarizer 57 (not shown). Whereas, after the S-polarized lighting beams $L_{5S}$ are continuously transmitted through the polarizer 57 and the lighting beam incidence plane 5311 of the first prism 531, the S-polarized lighting beams $L_{5S}$ are directed to the first facing plane 5312 of the first prism 531. The S-polarized lighting beams $L_{5S}$ are subject to the total internal reflection on the first facing plane 5312 of the first prism 531.

The reflected S-polarized lighting beams $L_{5S}$ are sequentially transmitted through the first prism plane 5313 of the first prism 531 and the field lens 54, and then directed to the LCOS microdisplay element 55. Next, the S-polarized lighting beams $L_{5S}$ are reflected by the LCOS microdisplay element 55. Correspondingly, the S-polarized lighting beams $L_{5S}$ are converted into a plurality of P-polarized imaging beams $I_{5P}$ in response to the electronic image. The P-polarized imaging beams $I_{5P}$ are propagated along the corresponding imaging paths. The dotted lines as shown in FIG. 9 denote some of the imaging paths, i.e. the transmission paths of the P-polarized imaging beams $I_{5P}$.

The P-polarized imaging beams $I_{5P}$ from the LCOS microdisplay element 55 are sequentially transmitted through the field lens 54, the first prism plane 5313 of the first prism 531, the first facing plane 5312 of the first prism 531, the second facing plane 5322 of the second prism 532, the imaging beam emergence plane 5321 of the second prism 532 and the analyzer 58, and then directed to the optical projection lens 56. Consequently, the electronic image shown on the LCOS microdisplay element 55 is projected onto the screen 9 through the optical projection lens 56.

The concepts of the present invention may be further illustrated by referring to Snell's law. That is, if any S-polarized lighting beam $L_{5S}$ is incident to the first facing plane 5312 of the first prism 531 at a proper incidence angle, the total internal reflection occurs on the first facing plane 5312 of the first prism 531. Whereas, if the incidence angle is not proper, the S-polarized lighting beam $L_{5S}$ is transmitted through the first facing plane 5312 of the first prism 531. On the other hand, if any P-polarized imaging beam $I_{5P}$ is incident to the first facing plane 5312 of the first prism 531 at another proper incidence angle, the P-polarized imaging beam $I_{5P}$ is transmitted through the first facing plane 5312 of the first prism 531. Whereas, if the incidence angle is not proper, the total internal reflection occurs on the first facing plane 5312 of the first prism 531. The operating principles of the Snell's law are well known to those skilled in the art, and are not redundantly described herein.

In other words, if any S-polarized lighting beam $L_{5S}$ is transmitted through the first facing plane 5312 of the first prism 531 or any P-polarized imaging beam $I_{5P}$ is subject to the total internal reflection on the first facing plane 5312 of the first prism 531, the light loss problem occurs. For solving the light loss problem, the relative position between the collimating lens assembly 52 and the field lens 54 or the relative position between any two components needs to be properly managed. In such way, the incidence angle of the S-polarized lighting beam $L_{5S}$ incident to the first facing plane 5312 of the first prism 531 and the P-polarized imaging beam $I_{5P}$ incident to the first facing plane 5312 of the first prism 531 are well adjusted. That is, the optimal lighting paths and the optimal imaging paths are achieved.

In accordance with the present invention, the reflectivity of the total internal reflection prism 53 is close to 100%. That is, the reflectivity of the total internal reflection prism 53 is higher than the reflectivity of the reflective polarizer 23 or the reflective polarizing film 131 of the conventional projection system, which has been described in the background of the present disclosure. In such way, if the S-polarized lighting beams $L_{5S}$ are incident to the first facing plane 5312 of the first prism 531 at the proper incidence angle and thus the total internal reflection occurs, almost 100% of the S-polarized lighting beams $L_{5S}$ are subject to the total internal reflection on the first facing plane 5312 of the first prism 531. The reflected S-polarized lighting beams $L_{5S}$ are directed to the LCOS microdisplay element 55.

In the projection system 5 of this embodiment, the light beams are only transmitted through the polarizer 57 once during the light beams travel along the optical path from the illumination device 51 to the optical projection lens 56. That is, the polarizer 57 is only located in the lighting paths of the projection system 5. Moreover, due to the total internal reflection prism 53 of the projection system 5, the S-polarized lighting beams $L_{5S}$ are subject to the total internal reflection on the first facing plane 5312 of the first prism 531. Consequently, the optical projection lens 56 of the projection system 5 can receive more imaging beams because of the total internal reflection. Assuming that the light amount from the illumination device of the conventional projection system and the light amount from the illumination device of the projection system 5, the projection system 5 can output higher luminance than the conventional projection system.

Since the electronic image shown on the LCOS microdisplay element 55 is projected onto the screen 9 through the optical projection lens 56, the optical path lengths of any two imaging paths should be properly adjusted in order to minimize the optical aberration. In this embodiment, the gap between the first facing plane 5312 of the first prism 531 and the second facing plane 5322 of the second prism 532 is smaller than 0.1 mm. In addition, a first angle $\theta_{51}$ is defined between the first facing plane 5312 of the first prism 531 and the lighting optical axis 59, and a second angle $\theta_{52}$ is defined between the second facing plane 5322 of the second prism 532 and the lighting optical axis 59, wherein the sum of the first angle $\theta_{51}$ and the second angle $\theta_{52}$ is equal to 90 degrees. Preferably, the first angle $\theta_{51}$ and the second angle $\theta_{52}$ are both 45 degrees. Moreover, for reducing the loss of the lighting beams, the area of the first facing plane 5312 of the first prism 531 is smaller than the area of the second facing plane 5322 of the second prism 532.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection system, comprising:
   an illumination device for providing a source ray including a plurality of lighting beams in a first polarization state and a plurality of lighting beams in a second polarization state;
   a LCOS microdisplay element for showing an electronic image, wherein when said lighting beams in said first polarization state are directed to said LCOS microdisplay element, said lighting beams in said first polarization state are reflected by said LCOS microdisplay element, and said lighting beams in said first polarization state are converted into a plurality of imaging beams in said second polarization state in response to said electronic image;
   an optical projection lens for receiving and projecting said imaging beams in said second polarization state onto a screen; and
   an optical processing module arranged between said illumination device, said LCOS microdisplay element and said optical projection lens, wherein when said source ray is received by said optical processing module, said lighting beams of said source ray in said second polarization state are filtered off, and said lighting beams of said source ray in said first polarization state are outputted from said optical processing module to said LCOS microdisplay element, wherein said imaging beams in said second polarization state are received by said optical processing module and outputted to said optical projection lens, wherein said optical processing module at least comprises a total internal reflection prism and a polarizer, wherein said lighting beams in said second polarization state are blocked by said polarizer;

wherein said total internal reflection prism comprises a first prism and a second prism, wherein said first prism comprises a lighting beam incidence plane and a first facing plane, and said second prism comprises an imaging beam emergence plane, a second facing plane, and a second prism plane arranged between said imaging beam emergence plane and said second facing plane, wherein said first facing plane and said second facing plane are separated from each other by a gap, and after said imaging beams in said second polarization state are at least transmitted through said second prism plane of said second prism, said imaging beams in said second polarization state are directed to and reflected by said second facing plane of said second prism, and said reflected imaging beams in said second polarization state are at least transmitted through said imaging beam emergence plane of said second prism and directed to said optical projection lens.

2. The projection system according to claim 1, further comprising an analyzer, wherein said analyzer is arranged between said imaging beam emergence plane of said second prism and said optical projection lens for blocking any beam in said first polarization state from being directed to said optical projection lens.

3. The projection system according to claim 1, wherein said optical processing module further comprises:
a collimating lens assembly arranged between said illumination device and said total internal reflection prism for adjusting an incidence angle of any received lighting beam in said first polarization state and outputting said adjusted lighting beam, and adjusting an incidence angle of any received lighting beam in said second polarization state and outputting said adjusted lighting beam; and
a field lens arranged between said total internal reflection prism and said LCOS microdisplay element for adjusting an incidence angle of any received lighting beam in said first polarization state and outputting said adjusted lighting beam, and adjusting an incidence angle of any received imaging beam in said second polarization state and outputting said adjusted imaging beam.

4. The projection system according to claim 1, wherein said polarizer is arranged between said first facing plane of said first prism and said second facing plane of said second prism, wherein after said lighting beams in said first polarization state are at least sequentially transmitted through said lighting beam incidence plane of said first prism, said first facing plane of said first prism, said polarizer, said second facing plane of said second prism and said second prism plane of said second prism, said lighting beams in said first polarization state are directed to said LCOS microdisplay element; or
wherein said polarizer is arranged between said illumination device and said lighting beam incidence plane of said first prism, wherein after said lighting beams in said first polarization state are at least sequentially transmitted through said polarizer, said lighting beam incidence plane of said first prism, said first facing plane of said first prism, said second facing plane of said second prism and said second prism plane of said second prism, said lighting beams in said first polarization state are directed to said LCOS microdisplay element.

5. The projection system according to claim 4, wherein if said polarizer is arranged between said first facing plane of said first prism and said second facing plane of said second prism, said polarizer is attached on said first facing plane of said first prism, or said polarizer is separated from said first facing plane of said first prism, wherein if said polarizer is arranged between said illumination device and said lighting beam incidence plane of said first prism, said polarizer is attached on said lighting beam incidence plane of said first prism, or said polarizer is separated from said lighting beam incidence plane of said first prism.

6. The projection system according to claim 1, wherein said projection system has a lighting optical axis, a first angle between said first facing plane of said first prism and said lighting optical axis is in a range between 20 degrees and 70 degrees, and a second angle between said second facing plane of said second prism and said lighting optical axis is 45 degrees; or
wherein said projection system has a lighting optical axis, a second angle between said second facing plane of said second prism and said lighting optical axis is 45 degrees, and said first facing plane of said first prism is parallel with said second facing plane of said second prism.

7. The projection system according to claim 1, wherein said polarizer is a reflective polarizer or an absorptive polarizer, said first polarization state is a P-polarized state, and said second polarization state is an S-polarized state, wherein each of said first prism and said second prism has a refractive index in a range between 1.41 and 2.2, or said first prism is a triangular prism or a thin flat glass, or an area of said first facing plane of said first prism is greater than an area of said second facing plane of said second prism.

8. A projection system, comprising:
a LCOS microdisplay element for showing an electronic image;
a total internal reflection prism comprising a first prism and a second prism, wherein said first prism comprises a lighting beam incidence plane and a first facing plane, and said second prism comprises an imaging beam emergence plane, a second facing plane, and a second prism plane arranged between said imaging beam emergence plane and said second facing plane, wherein said first facing plane and said second facing plane are separated from each other by a gap;
a polarizer;
an optical projection lens for receiving and projecting said imaging beams in a specific polarization state onto a screen; and
an illumination device for providing a source ray to said LCOS microdisplay element, creating a plurality of lighting paths between said illumination device and said LCOS microdisplay element, and creating a plurality of imaging paths between said LCOS microdisplay element and said optical projection lens, so that said electronic image is projected onto a screen through said optical projection lens,
wherein said lighting paths and said imaging paths are determined according to said total internal reflection prism, and said polarizer is only located in said lighting paths for blocking any lighting beam of said source ray in a specified polarization state from being directed to said LCOS microdisplay element, and after said imaging beams in said specific polarization state are at least transmitted through said second prism plane of said second prism, said imaging beams in said specific polarization state are directed to and reflected by said second facing plane of said second prism, and said reflected imaging beams in said specific polarization state are at least transmitted through said imaging beam emergence plane of said second prism and directed to said optical projection lens.

9. The projection system according to claim 8, wherein said source ray comprises a plurality of lighting beams in a first polarization state and a plurality of lighting beams in a second polarization state, and said lighting beams in said first polarization state and said lighting beams in said second polarization state are propagated along said lighting paths, wherein said lighting beams in said second polarization state are blocked by said polarizer, wherein when said lighting beams in said first polarization state are directed to and reflected by said LCOS microdisplay element, said lighting beams are converted into a plurality of imaging beams in said second polarization state in response to said electronic image, wherein said imaging beams in said second polarization state are said imaging beams in said second polarization state and propagated along said imaging paths.

10. The projection system according to claim 9, further comprising an analyzer, wherein said analyzer is arranged between said imaging beam emergence plane of said second prism and said optical projection lens for blocking any beam in said first polarization state from being directed to said optical projection lens.

11. The projection system according to claim 9, further comprising:
a collimating lens assembly arranged between said illumination device and said total internal reflection prism for adjusting an incidence angle of any received lighting beam in said first polarization state and outputting said adjusted lighting beam, and adjusting an incidence angle of any received lighting beam in said second polarization state and outputting said adjusted lighting beam; and
a field lens arranged between said total internal reflection prism and said LCOS microdisplay element for adjusting an incidence angle of any received lighting beam in said first polarization state and outputting said adjusted lighting beam, and adjusting an incidence angle of any received imaging beam in said second polarization state and outputting said adjusted imaging beam.

12. The projection system according to claim 9, wherein said polarizer is arranged between said first facing plane of said first prism and said second facing plane of said second prism, wherein after said lighting beams in said first polarization state are at least sequentially transmitted through said lighting beam incidence plane of said first prism, said first facing plane of said first prism, said polarizer, said second facing plane of said second prism and said second prism plane of said second prism, said lighting beams in said first polarization state are directed to said LCOS microdisplay element; or
wherein said polarizer is arranged between said illumination device and said lighting beam incidence plane of said first prism, wherein after said lighting beams in said first polarization state are at least sequentially transmitted through said polarizer, said lighting beam incidence plane of said first prism, said first facing plane of said first prism, said second facing plane of said second prism and said second prism plane of said second prism, said lighting beams in said first polarization state are directed to said LCOS microdisplay element.

13. The projection system according to claim 12, wherein if said polarizer is arranged between said first facing plane of said first prism and said second facing plane of said second prism, said polarizer is attached on said first facing plane of said first prism, or said polarizer is separated from said first facing plane of said first prism, wherein if said polarizer is arranged between said illumination device and said lighting beam incidence plane of said first prism, said polarizer is attached on said lighting beam incidence plane of said first prism, or said polarizer is separated from said lighting beam incidence plane of said first prism.

14. The projection system according to claim 8, wherein said projection system has a lighting optical axis, a first angle between said first facing plane of said first prism and said lighting optical axis is in a range between 20 degrees and 70 degrees, and a second angle between said second facing plane of said second prism and said lighting optical axis is 45 degrees; or
wherein said projection system has a lighting optical axis, a second angle between said second facing plane of said second prism and said lighting optical axis is 45 degrees, and said first facing plane of said first prism is parallel with said second facing plane of said second prism.

15. The projection system according to claim 8, wherein said polarizer is a reflective polarizer or an absorptive polarizer, said first polarization state is a P-polarized state, and said second polarization state is an S-polarized state, wherein each of said first prism and said second prism has a refractive index in a range between 1.41 and 2.2, or said first prism is a triangular prism or a thin flat glass, or an area of said first facing plane of said first prism is greater than an area of said second facing plane of said second prism.

* * * * *